United States Patent
Durrett et al.

(10) Patent No.: US 9,605,708 B2
(45) Date of Patent: Mar. 28, 2017

(54) SINGLE-SHAFT DUAL EXPANSION INTERNAL COMBUSTION ENGINE

(71) Applicant: GM GLOBAL TECHNOLOGY OPERATIONS LLC, Detroit, MI (US)

(72) Inventors: Russell P. Durrett, Bloomfield Hills, MI (US); Paul M. Najt, Bloomfield Hills, MI (US); Peter Andruskiewicz, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 14/610,409

(22) Filed: Jan. 30, 2015

(65) Prior Publication Data

US 2016/0222872 A1     Aug. 4, 2016

(51) Int. Cl.
| | |
|---|---|
| *F02B 75/24* | (2006.01) |
| *F16C 7/02* | (2006.01) |
| *F02B 75/32* | (2006.01) |
| *F02B 41/06* | (2006.01) |
| *F02B 33/00* | (2006.01) |

(52) U.S. Cl.
CPC .............. *F16C 7/023* (2013.01); *F02B 41/06* (2013.01); *F02B 75/32* (2013.01); *F02B 33/00* (2013.01)

(58) Field of Classification Search
CPC .......... F02B 33/22; F02B 75/02; F02B 75/32; F02B 41/06; F02B 29/0493; F02B 34/04; F02B 33/26; F02B 75/228; F02B 2075/027; F02B 2075/025; F02B 1/12; F02B 33/18; F02B 41/08; F02B 19/18; F02B 25/145; F02B 75/045; F02B 75/246; F02B 33/04;

(Continued)

(56) References Cited

U.S. PATENT DOCUMENTS

| | | | | |
|---|---|---|---|---|
| 2,269,948 A | * | 1/1942 | Mallory | ................. F02B 19/06 123/52.3 |
| 3,999,523 A | * | 12/1976 | Andreen | ................. F02B 75/32 123/52.5 |

(Continued)

OTHER PUBLICATIONS

Chongming Wang, Ritchie Daniel, Hongming Xu; "Research of the Atkinson Cycle in the Spark Ignition Engine"; SAE International; 2012-01-0390; Published Apr. 16, 2012; 9 pages.

(Continued)

*Primary Examiner* — Marguerite McMahon
*Assistant Examiner* — Tea Holbrook
(74) *Attorney, Agent, or Firm* — Quinn Law Group, PLLC (57) ABSTRACT

A single-shaft dual expansion internal combustion engine is described, and includes an engine block including first and second power cylinders and an expander cylinder fluidly coupled through a cylinder head, and first and second power pistons that connect to respective first and second crankpins of the crankshaft. A multi-link connecting rod assembly includes a rigid main arm extending orthogonally to a longitudinal axis of the crankshaft and supporting a first pivot pin, a second pivot pin and a third pivot pin. The first pivot pin connects via a connecting rod to an expander piston reciprocating in the third cylinder. A third crankpin of the crankshaft serves as the second pivot pin and has a throw that is located 180 degrees of rotation of the crankshaft from a throw of the first crankpin. The third pivot pin connects to a swing arm connected to the engine block.

20 Claims, 4 Drawing Sheets

(58) Field of Classification Search
CPC ...... F02B 75/1896; F02B 75/243; F01B 7/12; F01B 9/02
USPC ....... 123/53.1, 53.3, 54.1, 53.4, 53.5, 197.4, 123/193.3, 193.6, 68, 64, 70 R, 71 R
See application file for complete search history.

(56) References Cited

U.S. PATENT DOCUMENTS

| | | | | |
|---|---|---|---|---|
| 4,516,539 | A * | 5/1985 | Andreen | F02B 33/16 123/197.1 |
| 4,917,054 | A * | 4/1990 | Schmitz | F02B 41/06 123/58.8 |
| 5,010,860 | A * | 4/1991 | Broussard | F02B 19/02 123/256 |
| 6,553,977 | B2 * | 4/2003 | Schmitz | F02B 41/06 123/561 |
| 2013/0186354 | A1 * | 7/2013 | Torkildsen | F02B 75/32 123/41.72 |
| 2014/0137824 | A1 | 5/2014 | Jacques et al. | |
| 2015/0275747 | A1 * | 10/2015 | Durrett | F02B 75/04 123/48 R |
| 2016/0222877 | A1 * | 8/2016 | Durrett | F02B 41/06 |

OTHER PUBLICATIONS

Sei Watanabe, Hibiki Koga, Shonei Kono (Honda R&D Co., Ltd.); "Research on Extended Expansion General-Purpose Engine"; SAE International Technical Paper Series; SAE 2006-32-0101 JSAE 20066601; Small Engine Technology Conference and Exhibition, San Antonio, Texas; Nov. 13-16, 2006; 10 pages.

Ryosuke Hiyoshi, Shunichi Aoyama, Shinichi Takemura, Kenshi Ushijima, Takanobu Sugiyama (Nissan Motor Co., LTD); "A Study of a Multiple-link Variable Compression Ratio System for Improving Engine Performance"; SAE International Technical Paper Series; 2006-01-0616; 2006 SAE World Congress, Detroit, Michigan; Apr. 3-6, 2006; 11 pages.

* cited by examiner

SINGLE-SHAFT DUAL EXPANSION INTERNAL COMBUSTION ENGINE

TECHNICAL FIELD

The present teachings generally include an internal combustion engine assembly.

BACKGROUND

Internal combustion engines combust mixtures of air and fuel to generate mechanical power for work. The basic components of an internal combustion engine are well known in the art and preferably include an engine block, cylinder head, cylinders, pistons, valves, crankshaft and one or more camshafts. The cylinder heads, cylinders and tops of the pistons form variable volume combustion chambers into which fuel and air are introduced and combustion occurs as part of a thermodynamic cycle of the device. In all internal combustion engines, useful work is generated from the hot, gaseous products of combustion acting directly on moveable engine components, such as the top or crown of a piston. Generally, reciprocating motion of the pistons is transferred to rotary motion of a crankshaft via connecting rods. One known internal-combustion engine operates in a four-stroke combustion cycle, wherein a stroke is defined as a complete movement of a piston from a top-dead-center (TDC) position to a bottom-dead-center (BDC) position or vice versa, and the strokes include intake, compression, power and exhaust. Accordingly, a four-stroke engine is defined herein to be an engine that requires four complete strokes of a piston for every power stroke of a cylinder charge, i.e., for every stroke that delivers power to a crankshaft.

The overall efficiency of an internal combustion engine is dependent on its ability to maximize the efficiency of all the processes by minimizing the compromises that lead to energy losses to the environment. Dividing the traditional 4-stroke cycle amongst dedicated components allows the compression process to be made more efficient by attempting to approximate isothermal compression of a cylinder charge through mid-compression heat extraction, such as by using a heat exchanger. Likewise, a greater amount of mechanical energy may be harvested from a cylinder charge during expansion by moving towards an adiabatic expansion, and extending that expansion further to bring the working gases down to atmospheric pressure. In addition, maximizing the ratio of specific heats of the working gas while reducing each specific heat individually allows greater energy extraction over the expansion while minimizing the mechanical and flow losses associated with each dedicated component.

One known approach to meeting these challenges is a low temperature combustion (LTC) turbocharged diesel engine. The LTC turbocharged diesel relies on a two-stage compression process separated by charge cooling to approximate isothermal compression, reducing the work required to achieve a given air density, lean low temperature combustion to minimize heat losses while improving gas properties, and a two-stage expansion process to enhance work recovery from the hot post-combustion gases. Thermodynamically, the turbocharged diesel is a multi-shaft dual-compression, dual expansion engine, which is an engine that relies on a combination of rotating and reciprocating machines to execute two compressions prior to combustion and two expansions post combustion. However, the overall efficiency of the modern turbocharged diesel is limited by the ability to match and optimize the performance of these components over the operating domain. Air handling systems used to provide boosting on externally-charged multi-shaft engines include more complex boosting systems using two and three stages of turbocharging or combinations of turbochargers and mechanically driven superchargers. In addition to the charging devices, the systems require heat exchangers, bypass valves and controls.

SUMMARY

A single-shaft dual expansion internal combustion engine is described and includes an engine block, a cylinder head, a single crankshaft and a multi-link connecting rod assembly. The engine block includes first and second power cylinders and an expander cylinder. The cylinder head fluidly couples the first and second power cylinders and the expander cylinder. The first and second power pistons reciprocate in the first and second power cylinders, respectively, and connect to first and second crankpins of the crankshaft, respectively. The multi-link connecting rod assembly includes a rigid main arm extending orthogonally to a longitudinal axis of the crankshaft and supporting a first pivot pin located on a first end of the main arm, a second pivot pin located on a central portion of the main arm and a third pivot pin located on a second end of the main arm. The first pivot pin connects via a connecting rod to an expander piston reciprocating in the third cylinder. A third crankpin of the crankshaft serves as the second pivot pin and has a throw that is located 180 degrees of rotation around the longitudinal axis of the crankshaft from a throw of the first and second crankpins. The third pivot pin connects to a swing arm connected to the engine block.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIGS. 4-1 through 4-5 pictorially represent operation of an embodiment of the single-shaft dual expansion internal combustion engine including an optional supercharger during sequentially-executed engine strokes associated with operation thereof in accordance with the disclosure.

DETAILED DESCRIPTION

Figure 1:
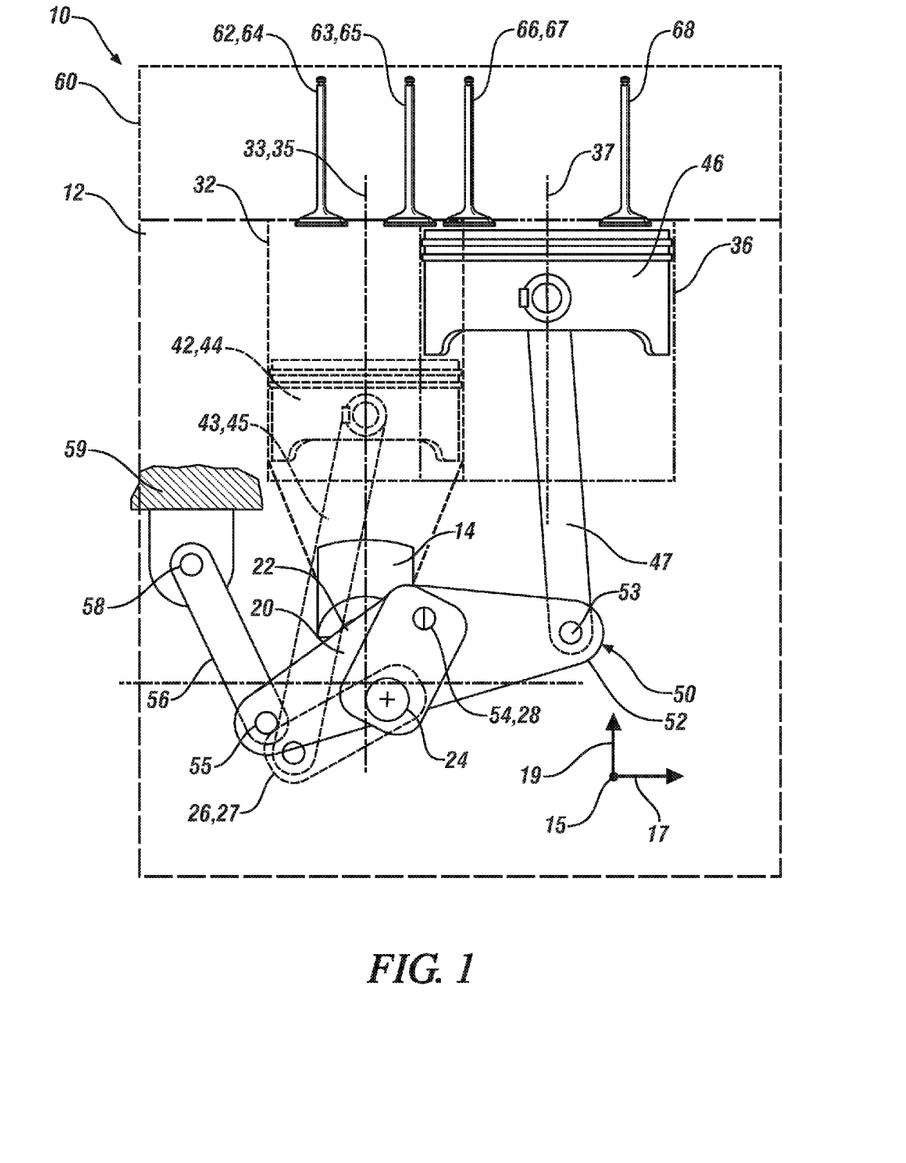
FIG. 1 schematically illustrates an end view of one embodiment of a single-shaft dual expansion internal combustion engine, in accordance with the disclosure.
Figure 2:
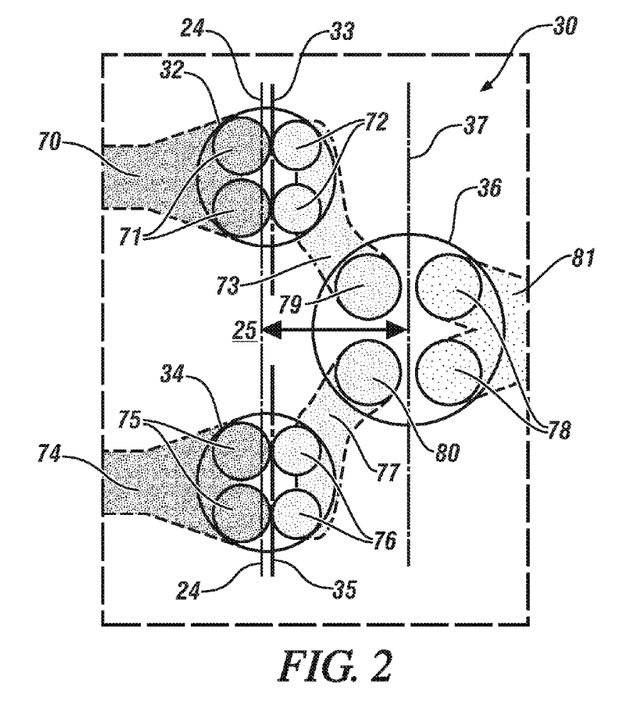
FIG. 2 schematically illustrates a top view of a portion of one embodiment of a single-shaft dual expansion internal combustion engine, in accordance with the disclosure.

Referring to the drawings, wherein like reference numbers are used to identify like or identical components in the various views, FIG. 1 schematically illustrates an end view of one embodiment of a single-shaft dual expansion internal combustion engine (engine) 10 and FIG. 2 schematically illustrates a top view of a portion of the embodiment of the engine 10 in accordance with this disclosure. Like numerals indicate like elements throughout the various Figures. The engine 10 includes an engine block 12 that includes a compound cylinder configuration including cylinder triplets 30 as described herein, a crankshaft main bearing mount 14 and main bearing 22 for a crankshaft 20 and a cylinder head 60. Although only one cylinder triplet 30 is shown, the engine block 12 may define a plurality of cylinder triplets 30 as described herein. The physical description is made with reference to a three-dimensional axis including a longitudinal axis 15, a horizontal axis 17 and a vertical axis 19, with the longitudinal axis 15 defined by a crankshaft center line 24 of the crankshaft 20, the vertical axis 19 defined by parallel longitudinal axes of engine cylinders 32, 34, 36 composing one of the cylinder triplets 30 and the horizontal axis 17 defined as being orthogonal to the longitudinal axis 15 and the vertical axis 19.

Each compound cylinder configuration includes one of the cylinder triplets 30 that includes first and second power cylinders 32, 34, respectively, and a third, expander cylinder 36. The first power cylinder 32 houses a first power piston 42 that rotatably couples to a first crankpin 26 of the crankshaft 20 through a first connecting rod 43 and is moveable therein to translate up and down in conjunction with rotation of the crankshaft 20, and also defines a first power cylinder center line 33. Similarly, the second power cylinder 34 houses a second power piston 44 that rotatably couples to a second crankpin 27 of the crankshaft 20 through a second connecting rod 45 and is moveable therein to translate up and down in conjunction with rotation of the crankshaft 20, and also defines a second power cylinder center line 35. The first and second power cylinders 32, 34, first and second power pistons 42, 44 and associated components are dimensionally equivalent, and the first and second crankpins 26, 27 rotatably couple to the crankshaft 20 at the same rotational crank angle and are radially coincident. In one embodiment, the first and second power cylinder center lines 33, 35 intersect with the crankshaft center line 24. Alternatively the first and second power cylinder center lines 33, 35 are eccentric to the crankshaft center line 24.

The expander cylinder 36 is adjacent to the first and second power cylinders 32, 34, and has a center line 37 that is parallel to the first and second power cylinder center lines 33, 35 and is offset from the crankshaft center line 24 on a side opposed to the first and second power cylinder center lines 33, 35. A distance 25 is defined by an orthogonal distance in the horizontal direction between the crankshaft center line 24 and the center line 37 of the expander cylinder 36. An expander piston 46 is housed in the expander cylinder 36 and is moveable therein to translate up and down, and couples to a third connecting rod 47 that rotatably couples to the crankshaft 20 by a multi-link connecting rod assembly 50. The expander cylinder 36 is preferably considerably larger in volume than the individual power cylinders 32, 34, and is preferably in a range between 1.5 times and 4.0 times the volume of one of the individual power cylinders 32, 34. Cylinder displacement for the expander cylinder 36 as defined based upon piston movement between a TDC location and a BDC location of the cylinder is application-specific and is determined as described herein.

The cylinder head 60 is an integrated device including cast portions, machined portions and assembled portions for controlling and directing flows of intake air, fuel and combustion gases into and out of the first and second power cylinders 32, 34 and the expander cylinders 36 to effect engine operation to generate mechanical power. The cylinder head 60 includes structural bearing supports for power camshaft(s) and an expander camshaft that are rotatably coupled and indexed to the crankshaft 20. The cylinder head 60 includes first and second power cylinder intake runners 70, 74, respectively, which fluidly connect to first and second power cylinder intake ports 71, 75, respectively, with engine intake airflow controlled by first and second power cylinder intake valves 62, 64, respectively. As shown, there are two intake valves per cylinder, although any suitable quantity, e.g., one or three intake valves per cylinder, may be employed. Engine intake air originates from an ambient air source, which may pass through a pressurizing device such as a turbocharger or a supercharger prior to entering the first and second power cylinder intake runners 70, 74. The cylinder head 60 also includes first and second power cylinder exhaust ports 72, 76, with engine exhaust airflow controlled by first and second power cylinder exhaust valves 63, 65, respectively. As shown, there are two exhaust valves per cylinder, although any suitable quantity, e.g., one or three exhaust valves per cylinder, may be employed. The first and second power cylinder intake valves 62, 64 and exhaust valves 63, 65 are normally-closed spring-biased poppet valves that are activated by rotation of the power camshaft(s) in one embodiment, and may alternatively include any other suitable valve configuration. The cylinder head 60 supports elements necessary for combustion, e.g., a spark plug and a fuel injector for each of the first and second power cylinders 32, 34 in one embodiment. The first power cylinder exhaust port 72 fluidly couples via a first expander cylinder intake runner 73 to a first expander cylinder intake port 79, with flow controlled by a first expander cylinder intake valve 66 and the first power cylinder exhaust valve 63. The second power cylinder exhaust port 76 fluidly couples via a second expander cylinder intake runner 77 to a second expander cylinder intake port 80, with flow controlled by a second expander cylinder intake valve 67 and the second power cylinder exhaust valve 65. The cylinder head 60 also includes one or a plurality of expander cylinder exhaust port(s) 78, two of which are shown, with corresponding expander cylinder exhaust valve(s) 68 that fluidly connect to an expander cylinder exhaust runner 81 that leads to an exhaust system that may include exhaust purification devices, a turbocharger, exhaust sound tuning devices, etc. The first expander cylinder intake valve 66, the second expander cylinder intake valve 67 and the expander cylinder exhaust valve(s) 68 are normally-closed spring-biased poppet valves that are activated by rotation of the expander camshaft in one embodiment, and may alternatively include any other suitable valve configuration. The rotations of the power camshaft(s) and the expander camshaft are indexed and linked to rotation of the crankshaft 20. The first and second crankpins 26, 27 of the crankshaft 20 rotatably couple with the first and second power pistons 42, 44 through the first and second connecting rods 43, 45.

The multi-link connecting rod assembly 50 forms a six-bar linkage that translates linear reciprocating motion of the expander piston 46 offset from the crankshaft centerline 24 to rotary motion of the crankshaft 20 while minimizing side-loading of the expander piston 46. The multi-link connecting rod assembly 50 includes a rigid main link arm 52 that is a three-pin plate that includes a first pivot pin 53, a second pivot pin 54 and a third pivot pin 55. The first pivot pin 53 of the main link arm 52 rotatably couples to the third connecting rod 47 that couples to the expander piston 46 via an axle, shank or other suitable connector. The second pivot pin 54 of the main link arm 52 rotatably couples to the third crankpin 28 of the crankshaft 20. The third crankpin 28 of the crankshaft 20 is collocated with the second pivot pin 54 of the multi-link connecting rod assembly 50, and both are rotated 180° from the first and second crankpins 26, 27. The third pivot pin 55 of the main link arm 52 rotatably couples to a first end of a swing arm 56, and a second end of the swing arm 56 rotatably couples to a mounting pin 58 that pivotably attaches to a fixed mount 59 the engine block 12. The multi-link connecting rod assembly 50 is configured such that the movement of the expander piston 46 is 180° out of phase with movement of the first and second power pistons 42, 44. Furthermore, the arrangement of the elements of the multi-link connecting rod assembly 50 affects the stroke of the expander piston 46 and hence the volumetric displacement and geometric compression ratio of the expander cylinder 36.

The multi-link connecting rod assembly 50 mechanically couples the in-cylinder translation of the first and second power pistons 42, 44 with the in-cylinder translation of the expander piston 46 during rotation of the crankshaft 20 through the first, second and third crankpins 26, 27 and 28. The first pivot pin 53 and the second pivot pin 54 of the rigid main link arm 52 define a first linear distance. The second pivot pin 54 and the third pivot pin 55 define a second linear distance. A magnitude of linear travel of the expander piston 46 reciprocating in the third cylinder 36 during rotation of the crankshaft 20 is defined based upon the first linear distance and the second linear distance and the location of the mounting pin 58 in the engine block 12 on which the swing arm 56 is attached. This configuration including the main link arm 52 permits the stroke of the expander piston 46 to differ from the crank throw length that is defined by the third crankpin 28 of the crankshaft 20. Preferably, the multi-link connecting rod assembly 50 amplifies the stroke of the expander piston 46 in relation to the crank throw length of the third crankpin 28, with the amplification factor determined by the geometry thereof including the first and second linear distances between the first, second and third pivot pins 53, 54, 55 and the swing arm 56.

Operation of the engine 10 described herein includes as follows. The first and second power cylinders 32, 34 both operate in four-stroke cycles including repetitively executed intake-compression-expansion-exhaust strokes over 720° of crankshaft rotation. The four-stroke cycle associated with the second power cylinder 34 is out of phase from the cycle associated with the first power cylinder 32 by 360° of crankshaft rotation. As such, when the first power cylinder 32 is in the intake stroke, the second power cylinder 34 is in the expansion stroke, and when the second power cylinder 34 is in the intake stroke, the first power cylinder 32 is in the expansion stroke. The expander cylinder 36 operates in a two-stroke cycle including an intake stroke and an exhaust stroke, wherein the intake stroke is alternately coordinated with the exhaust strokes from the first and second power cylinders 32, 34. As such, each of the power cylinders 32, 34 displaces its exhaust gas into the expander cylinder 42 in alternating fashion. This operation is shown graphically with reference to FIG. 4.

Figure 3:
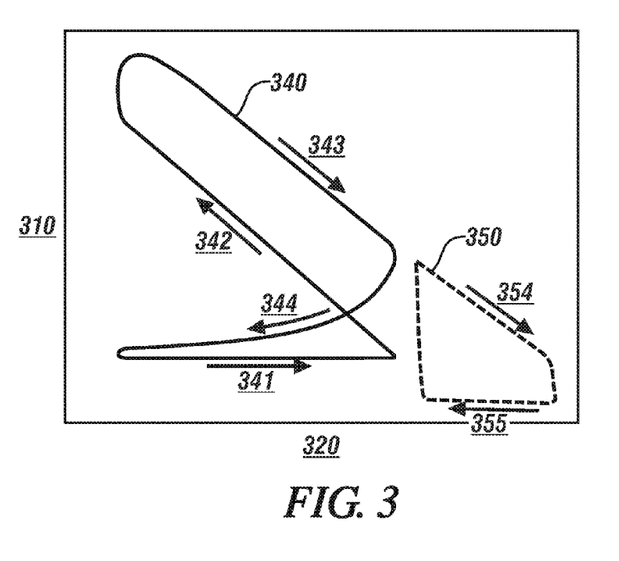
FIG. 3 graphically shows a pressure-volume (PV) diagram that is associated with operation of an embodiment of a single-shaft dual expansion internal combustion engine, in accordance with the disclosure.

FIGS. 4-1 through 4-5 pictorially represent operation of an embodiment of the single-shaft dual expansion internal combustion engine 410 including an optional supercharger 412 for pressurizing intake air, first and second power cylinders 432 and 434 and expander cylinder 436 during sequentially-executed engine strokes associated with operation thereof. FIG. 3 graphically shows a corresponding pressure-volume (PV) diagram that is associated with the operation in the strokes of FIGS. 4-1 through 4-5. The PV diagram shown with reference to FIG. 3 includes in-cylinder pressure (bar) 310 plotted on the vertical axis in relation to cylinder displaced volume (L) 320 plotted on the horizontal axis, and includes PV lines indicating a working fluid state associated with in-cylinder conditions of the first power cylinder 432 (340) and the expander cylinder 436 (350). Various arrows indicate directions of travel of pistons associated with the various cylinders.

Figure 41:
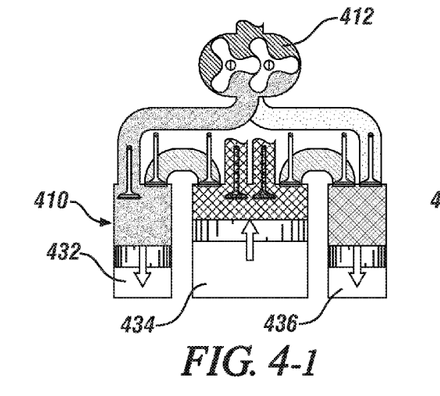

FIG. 4-1 shows a first intake/second expansion stroke, which includes the first power cylinder 432 in an intake stroke, the second power cylinder 434 in a power stroke and the expander cylinder 436 in an exhaust stroke. Corresponding line segment 341 of Line 340 indicating work associated with the first power cylinder 432 in FIG. 3 indicates a slight decrease in pressure with increased power cylinder volume.

Figure 42:
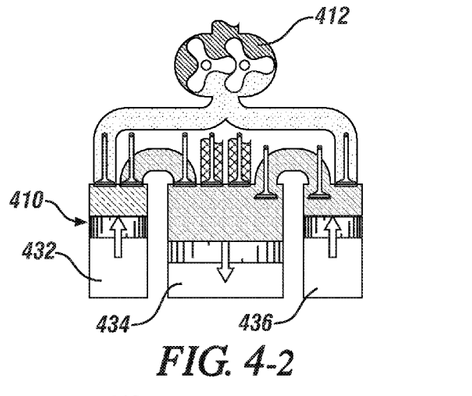

FIG. 4-2 shows a first compression/second exhaust stroke, which includes the first power cylinder 432 in a compression stroke, the second power cylinder 434 in an exhaust stroke and the expander cylinder 436 in an expansion stroke employing input flow from the second power cylinder 434. Corresponding line segment 342 of Line 340 indicating work associated with the first power cylinder 432 in FIG. 3 indicates a substantial increase in pressure with decreased power cylinder volume.

Figure 43:
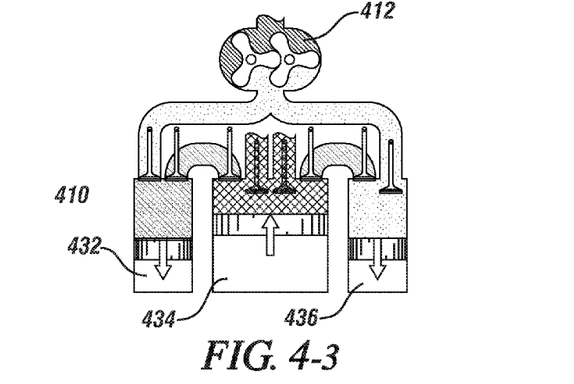

FIG. 4-3 shows a first expansion/second intake stroke, which includes the first power cylinder 432 in an expansion stroke, the second power cylinder 434 in an intake stroke and the expander cylinder 436 in an exhaust stroke. Corresponding line segment 343 of Line 340 indicating work associated with the first power cylinder 432 in FIG. 3 indicates a substantial decrease in pressure with increased power cylinder volume.

Figure 44:
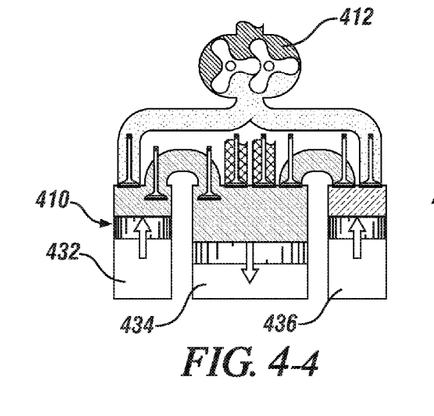

FIG. 4-4 shows a first exhaust/second compression stroke, which includes the first power cylinder 432 in an exhaust stroke, the second power cylinder 434 in a compression stroke and the expander cylinder 436 in an expansion stroke employing input flow from the first power cylinder 432. Corresponding line segment 344 of Line 340 indicating work associated with the first power cylinder 432 in FIG. 3 indicates a continued decrease in pressure with decreased power cylinder volume and completes the cycle loop for the first power cylinder 432. Corresponding line segment 354 of Line 350 indicating work associated with the expander cylinder 436 indicates a continued decrease in pressure with increased expander cylinder volume.

Figure 45:
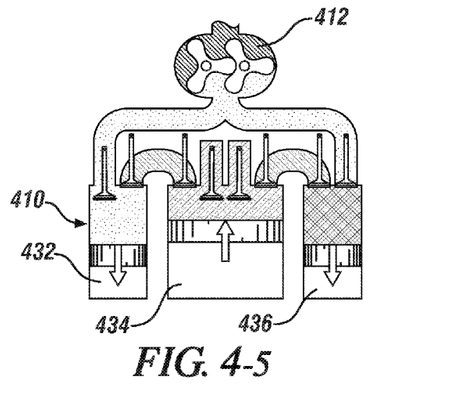

FIG. 4-5 shows a second cycle of the first intake/second expansion stroke, which includes the first power cylinder 432 in an intake stroke, the second power cylinder 434 in a power stroke and the expander cylinder 436 in an exhaust stroke. Corresponding line segment 341 of Line 340 indicating work associated with the first power cylinder 432 in FIG. 3 indicates a slight decrease in pressure with increased power cylinder volume. Corresponding line segment 355 of Line 350 indicating work associated with the expander cylinder 436 indicates in-cylinder pressure is initially unchanged with decrease in cylinder volume, and then increases sharply as the valves close.

Figure 5:
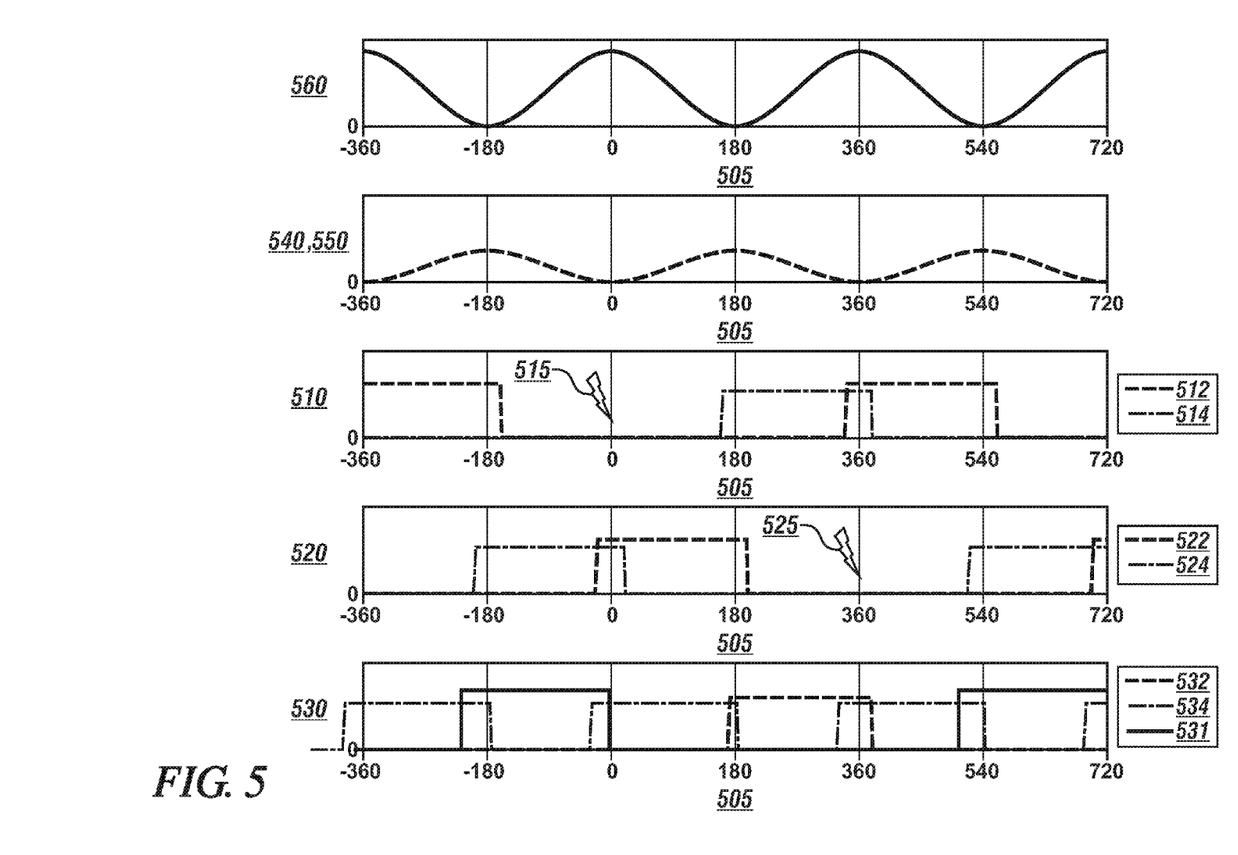
FIG. 5 graphically shows operation of the single-shaft dual expansion internal combustion engine over the course of a single combustion cycle in terms of openings and closings of the various intake and exhaust valves in relation to crank angle and cylinder volumetric displacements and corresponding spark ignition events, in accordance with the disclosure.

FIG. 5 graphically shows operation of the single-shaft dual expansion internal combustion engine 10 described herein over the course of a single combustion cycle in terms of openings and closings of the various intake and exhaust valves in relation to crank angle and cylinder volumetric displacements and corresponding spark ignition events. Overall, the first and second power cylinders 32, 34 both operate in a four-stroke cycle including repetitively executed intake-compression-expansion-exhaust strokes over 720° of crankshaft rotation, with the cycle associated with the second power cylinders 34 out of phase from the cycle associated with the first power cylinders 32 by 360° of crankshaft rotation. The expander cylinder 36 operates in a two-stroke cycle including an intake stroke and an exhaust stroke, wherein the intake stroke is alternately coordinated with the exhaust strokes from the first and second power cylinders 32, 34. As such, each of the power cylinders 32, 34 displaces its exhaust gas into the expander cylinder 36 in alternating fashion. The expander cylinder 36 is preferably considerably larger in volume than the individual power cylinders 32, 34 as previously described.

The data includes volumetric displacement for the expander cylinder 36 (560), volumetric displacements for the first and second power cylinders 32, 34 (540, 550), operation of the first power cylinder 32 (510) including openings (1) and closings (0) of the intake valves 512 and the exhaust valves 514 and an associated combustion event 515, operation of the second power cylinder 34 (520) including openings (1) and closings (0) of the intake valves 522 and the exhaust valves 524 and an associated combustion event 525, operation of the first expander cylinder 36 (530) including openings (1) and closings (0) of the first intake valve 532, the second intake valve 531 and the exhaust valves 534, all of which is coincidentally graphed in relation to engine crank angle 505 between a nominal −360° crank angle and a nominal +720° crank angle.

The configuration as shown employs a compound cylinder configuration that includes first and second power cylinders 32, 34, respectively, and a third, expander cylinder 36. The multi-link connecting rod assembly 50 includes a rigid main link arm 52 including a first pivot pin 53, a second pivot pin 54, a third pivot pin 55 and a swing arm 56 that mechanically couples to a mounting pin 58 on the engine block 12. The multi-link connecting rod assembly 50 mechanically couples the in-cylinder translation of the first and second power pistons 42, 44 with the in-cylinder translation of the expander piston 46.

This arrangement permits the expander cylinder 36 and associated expander piston 46 to be significantly offset from the crankshaft centerline 24 without operating issues commonly associated with piston side loading. This arrangement allows the stroke of the expander piston 46 to be selected in relation to the crank throw of the third crankpin 28, but does not limit the stroke to be equivalent to the crank throw.

Such configurations allows for more compact design of an embodiment of the single-shaft dual expansion internal combustion engine 10, including an overall shorter engine length, shorter engine height, improved engine performance through reduced gas transfer losses associated with minimization of the lengths of the intake runners 73, 77 for the expander cylinder 36.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A single-shaft dual expansion internal combustion engine, comprising:
   an engine block, a cylinder head, a single crankshaft and a multi-link connecting rod assembly;
   the engine block including first and second power cylinders and an expander cylinder;
   the cylinder head fluidly coupling the first and second power cylinders and the expander cylinder;
   first and second power pistons reciprocating in the first and second power cylinders, respectively, and connected to respective radially coincident first and second crankpins of the crankshaft;
   the multi-link connecting rod assembly including a rigid main arm extending orthogonally to a longitudinal axis of the crankshaft and supporting a first pivot pin located on a first end of the main arm, a second pivot pin located on a central portion of the main arm and a third pivot pin located on a second end of the main arm;
   the first pivot pin connected via a connecting rod to an expander piston reciprocating in expander cylinder;
   the second pivot pin connected to a third crankpin of the crankshaft, the third crankpin having a throw that is located at 180 degrees of rotation around the longitudinal axis of the crankshaft from a throw of the first and second crankpins; and
   the third pivot pin connected to a swing arm connected to the engine block.

2. The single-shaft dual expansion internal combustion engine of claim 1, wherein the first pivot pin and the second pivot pin of the multi-link connecting rod assembly define a first linear distance, the second pivot pin and the third pivot pin of the multi-link connecting rod assembly define a second linear distance, and wherein a magnitude of linear travel of the expander piston reciprocating in the third cylinder is defined based upon the first linear distance and the second linear distance.

3. The single-shaft dual expansion internal combustion engine of claim 1, wherein the first and second power pistons synchronously reciprocate in the first and second power cylinders, respectively, and the expander piston reciprocates in the expander cylinder 180° out of phase with the first and second power pistons.

4. The single-shaft dual expansion internal combustion engine of claim 1, wherein the first pivot pin and the second pivot pin of the multi-link connecting rod assembly define a first linear distance, the second pivot pin and the third pivot pin of the multi-link connecting rod assembly define a second linear distance, and wherein a magnitude of linear travel of the expander piston reciprocating in expander cylinder is defined based upon the first linear distance, the second linear distance, a linear length of the swing arm connected between the third pivot pin and the engine block, and a location of the third pivot pin connecting the swing arm to the engine block.

5. The single-shaft dual expansion internal combustion engine of claim 1, wherein the first and second power cylinders and the expander cylinder have longitudinal center axes that are parallel, and wherein the longitudinal center axis of the expander cylinder is offset from a line formed between the longitudinal center axes of the first and second power cylinders.

6. The single-shaft dual expansion internal combustion engine of claim 1, wherein the cylinder head comprises a first exhaust port, a first exhaust runner and a first expander cylinder intake port fluidly connecting the first power cylinder to the expander cylinder and a second exhaust port, a second exhaust runner and a second expander cylinder intake port fluidly connecting the second power cylinder to the expander cylinder.

7. The single-shaft dual expansion internal combustion engine of claim 1, wherein the first power cylinder operates in a four-stroke combustion cycle and the second power cylinder operates in a four-stroke combustion cycle.

8. The single-shaft dual expansion internal combustion engine of claim 7, wherein the four-stroke combustion cycle of the first power cylinder executes 360 rotational degrees out of phase with the four-stroke combustion cycle of the second power cylinder.

9. The single-shaft dual expansion internal combustion engine of claim 1, wherein the expander cylinder operates in a two-stroke combustion cycle.

10. An internal combustion engine, comprising:
an engine block, a cylinder head and a single crankshaft;
the engine block including first and second power cylinders and an expander cylinder;
the cylinder head fluidly coupling the first and second power cylinders and the expander cylinder;
first and second power pistons reciprocating in the first and second power cylinders, respectively, and connected to respective radially coincident first and second crankpins of the crankshaft;
a multi-link connecting rod assembly including a rigid main arm extending orthogonally to a longitudinal axis of the crankshaft and supporting a first pivot pin located on a first end of the main arm, a second pivot pin located on a central portion of the main arm and a third pivot pin located on a second end of the main arm, including the first pivot pin connected via a connecting rod to an expander piston reciprocating in expander cylinder, the second pivot pin connected to a third crankpin of the crankshaft, the third crankpin having a throw that is located at 180 degrees of rotation around the longitudinal axis of the crankshaft from a throw of the first and second crankpins, and the third pivot pin connected to a swing arm connected to the engine block;
wherein the expander cylinder and associated expander piston are offset from a centerline of the crankshaft.

11. The internal combustion engine of claim 10, wherein the first and second power cylinders define center lines that intersect with the centerline of the crankshaft.

12. The internal combustion engine of claim 10, wherein the first and second power cylinders define center lines that are offset from the centerline of the crankshaft on a side opposite the expander cylinder.

13. The internal combustion engine of claim 10, wherein the first pivot pin and the second pivot pin of the multi-link connecting rod assembly define a first linear distance, the second pivot pin and the third pivot pin of the multi-link connecting rod assembly define a second linear distance, and wherein a magnitude of linear travel of the expander piston reciprocating in expander cylinder is defined based upon the first linear distance and the second linear distance.

14. The internal combustion engine of claim 10, wherein the first and second power pistons synchronously reciprocate in the first and second power cylinders, respectively, and the expander piston reciprocates in the expander cylinder 180° out of phase with the first and second power pistons.

15. The internal combustion engine of claim 10, wherein the first pivot pin and the second pivot pin of the multi-link connecting rod assembly define a first linear distance, the second pivot pin and the third pivot pin of the multi-link connecting rod assembly define a second linear distance, and wherein a magnitude of linear travel of the expander piston reciprocating in expander cylinder is defined based upon the first linear distance, the second linear distance, a linear length of the swing arm connected between the third pivot pin and the engine block, and a location of the third pivot pin connecting the swing arm to the engine block.

16. The internal combustion engine of claim 10, wherein the first and second power cylinders and the expander cylinder have longitudinal center axes that are parallel, and wherein the longitudinal center axis of the expander cylinder is offset from a line formed between the longitudinal center axes of the first and second power cylinders.

17. The internal combustion engine of claim 10, wherein the cylinder head comprises a first exhaust port, a first exhaust runner and a first expander cylinder intake port fluidly connecting the first power cylinder to the expander cylinder and a second exhaust port, a second exhaust runner and a second expander cylinder intake port fluidly connecting the second power cylinder to the expander cylinder.

18. The internal combustion engine of claim 10, wherein the first power cylinder operates in a four-stroke combustion cycle and the second power cylinder operates in a four-stroke combustion cycle.

19. The internal combustion engine of claim 18, wherein the four-stroke combustion cycle of the first power cylinder executes 360 rotational degrees out of phase with the four-stroke combustion cycle of the second power cylinder.

20. The internal combustion engine of claim 10, wherein the expander cylinder operates in a two-stroke combustion cycle.

* * * * *